United States Patent Office 3,407,085
Patented Oct. 22, 1968

3,407,085
METHOD OF RENDERING GLASS SURFACES ABRASION-RESISTANT AND GLASS ARTICLES PRODUCED THEREBY
Walter Kitaj, Toledo, and Leon Levene, Sylvania, Ohio, assignors to Owens-Illinois Glass Company, a corporation of Ohio
No Drawing. Filed Dec. 31, 1964, Ser. No. 422,539
11 Claims. (Cl. 117—72)

ABSTRACT OF THE DISCLOSURE

Glass surfaces are rendered abrasion resistant. The glass surface is first contacted with a pyrolyzable compound of titanium, zirconium, tin or vanadium while heated to above the pyrolyzing temperature of the compound to form an oxide of the metal. The glass surface is then cooled to a temperature below 350° F. and coated with an organic polyisocyanate and an organic polyol which react in situ to form a thin, transparent polyurethane coating on the surface.

---

The present invention relates to the treatment of glass surfaces which are subjected to abrasive contact with each other in the course of handling, filling, and packaging operations and, more particularly, to a method of treating such glass surfaces to improve their resistance to abrasion. This invention further relates to improved abrasion-resistant glass articles produced by the aforesaid method.

Glass derives its strength from an unblemished surface, and any scratches or flaws which are present on its surface considerably decrease its strength, down to as little as one-fourth of its original value. While glass articles such as jars, bottles, tumblers, and the like, have their maximum strength as soon as they are formed, this strength rapidly diminishes as the articles come into contact with each other and with other surfaces, as occurs during the handling, packaging and shipping of the glassware. This problem is particularly acute in the food- and beverage-processing field wherein the glass containers are subjected to various processing cycles, whereby the bottles are successively filled, closed, and packaged for delivery. Many times the bottles are also subjected to washing, sterilizing, or vacuum treatments, depending upon the particular products with which they are filled.

During each of these operations, the bottles continuously come into contact with each other as they move from station to station and as they are handled by the various apparatus. Breakage of bottles during these operations, particularly after the bottles have been filled, presents additional problems to the processors and adds to the total cost of the operations. To minimize the resulting scratching and abrading of the glass surfaces during the aforesaid operations, numerous attempts have been made in the past to cost the exterior glass surfaces with lubricant compositions. While coating compositions have been used commercially and impart good scratch-resistant properties to glass containers, the properties imparted by some of these compositions are considerably reduced, if not lost altogether, when the treated glass surface is wetted either by water or by steam, during the processing cycle. Glass containers for beer, for example, are subjected to a caustic wash prior to being filled, and the glass surfaces, being constantly jostled together as they successively move along the conveyors to the filling, capping, and packaging stations, become scratched and weakened due to the loss of the scratch-resistant properties originally imparted by the coating. Since the product is packaged under pressure, as are carbonated beverages, for example, it is extremely desirable that the surfaces of the containers have as few scratches or abrasions as possible when they ultimately reach the consumer.

It will be appreciated that if the bottles are coated with a composition having good wet and dry scratch-resistant or abrasion-resistant properties, more bottles can be handled by the filling and packaging apparatus in the same amount of time merely by spacing the bottles closer together and increasing the speed of the conveyors. Even though the bottles will be subjected to more contacts with adjoining bottles, the coating will afford sufficient protection so as not to weaken the glass bottles.

Accordingly, it is an object of this invention to provide a method for forming an abrasion-resistant coating on glass surfaces while avoiding the short comings of the methods and compositions known and used in the past in attempting to form such abrasion-resistant coatings.

Another object of this invention is to provide a thin, substantially transparent coating on a glass surface, which coating is highly resistant to abrasion, while simultaneously substantially maintaining the strength characteristics of the glass.

Still another object of this invention is to provide a method for coating a glass surface, such as the exterior of a glass container, so as to impart thereto improved dry and wet scratch-resisting properties, thus permitting the container to undergo normal handling, processing, and shipping, with the consequent rubbing of the glass surface with other surfaces, without materially decreasing the strength of the container.

A further object of this invention is to provide an article of manufacture having a glass surface and, on said surface having a tightly adhering, thin, substantially colorless and transparent coating which coating imparts superior wet and dry scratch-resisting and abrasion-resisting properties to the glass surface.

A further object of this invention is to provide glass ware having a thin, substantially colorless and transparent coating on its surface which coating is insoluble in water or caustic solutions, is free from taste and odor, and is nontoxic, so as to permit the ware to be safely used for food and beverages.

In attaining the objects of this invention, one feature resides in treating a glass surface with a titanium-, zirconium, vanadium-, or tin-containing compound which is pyrolyzable, i.e., thermally decomposable by the action of heat, to form oxides of the metal on the glass surface while the surface is at a temperature above the pyrolyzing temperature of the compound, cooling the treated glass, and applying to the cooled surface, while it is at a temperature up to about 350° F., a thin coating of a polyurethane-forming formulation. Upon curing, the polyurethane tenaciously bonds to the titanium oxide layer on the glass, forming a hard, thin, transparent, substantially colorless coating on the glass surface.

The above and other objects, features, and advantages of the present invention will become apparent to those skilled in the art upon a reading of the following description of the invention, which is discussed in terms of the titanium oxide-coated glass surfaces.

In carrying out the invention, the glass surface of an article of manufacture, such as a bottle, jar, tumbler, sheet glass, and the like, is first treated soon after the article leaves the glass-forming machine and as it is being conveyed to the annealing lehr. A solution of a titanium-containing compound is sprayed onto the exterior of the glass surface while it is at a temperature above the pyrolyzing temperature of the compound. The temperature of the shaped ware, as it leaves the glass-forming machine, is such that it is above the pyrolyzing temperature of the compounds. The range of temperatures necessary to pyrolyze the titanium-containing compounds is between about 700° and 1300° F., depending upon the particular compound used, with the preferred range being from about 900° to 1200° F.

The titanium-containing compound which is employed for the purpose of this invention is one which upon contact with the heated glass surface will react to form a substantially colorless, transparent layer or coating of titanium oxide, primarily $TiO_2$, which layer or coating tightly adheres to the surface of the glass and can have an average thickness of up to about 0.1 micron, but is preferably less than 800 Angstroms.

Among the titanium-containing compounds suitable for purposes of this invention are volatile metallo-organic compounds such as the alkyl titanates, preferably where the alkyl group has from 1–8 carbon atoms, and including tetrabutyl titanate, tetraisopropyl titanate, tetra-ethylhexyl titanate, and the like. Also included among the suitable titanium-containing compounds are the titanium tetrahalides and particularly titanium tetrachloride. Ammonium salts of titanium lactate also are suitable as is titanium acetyl acetonate.

As the glass articles, now coated with the thin, transparent titanium oxide layer, enter the annealing lehr and are progressively cooled over a period of time to about 300° F. and lower, they are sprayed with a polyurethane formulation which forms a thin, colorless, transparent coating on the surface. Alternatively, the bottles may be sprayed with the formulation after they leave the lehr. After the second coating is cured, the resultant coated article has a scratch-resistance value which is unexpectedly and vastly superior to that of a glass surface having either coating alone.

The polyurethane formulation useful for the process of this invention consists essentially of known mixtures of an organic polyisocyanate and a polyol, such as a polyester or polyether, in a solvent therefor.

Any of the commercially available organic polyisocyanates, such as 2,4-tolylene diisocyanate, 2,6-tolylene diisocyanate, diphenylmethane - 4,4' - diisocyanate, 3,3'-ditolylene-4,4'-diisocyanate, 2,4-toluene diisocyanate dimer, m- and p-phenylene diisocyanate, 4-chloro-1,3-phenylene diisocyanate, 4,4' - biphenylene diisocyanate, 1,5 - naphthalene diisocyanate, 3,3'-bitolylene 4,4'-diisocyanate, 3,3'-dimethyl diphenyl methane 4,4'-diisocyanate, 3,3'-dimethoxyl 4,4'-diphenylene diisocyanate, polymethylene polyphenyl isocyanate, hexamethylene diisocyanate,

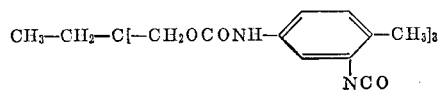

and the like are suitable for this purpose.

Among the polyols which may be utilized are included the polyesters, which are the polycondensation products of polycarboxylic acids or anhydrides, including adipic, malonic, succinic, glutaric, pimelic, phthalic, and the like, with polyhydric alcohols, including glycol, diethylene glycol, 1,2-propylene glycol, trimethylol propane, 1,3-butylene glycol, 1,4-butylene glycol, N-diethyl amino ethanol, and the like. Also included are the polyethers, such as polyalkylene ethers, including polybutylene ether, polypropylene glycol ethers, mixed polypropylene-polyethylene glycol ethers, and the like. Such polyethers include Hyprin GP-30 which is a hydroxypropyl glycerine having a molecular weight of 260 and an OH number of 660; TP-740 which is a polyoxypropylene derivative of trimethylolpropane having a molecular weight of 732 and an OH number of 230; PEP-650 and PEP-450 which are tetrols having a molecular weight of 600 and 400 and OH numbers of 374 and 560, respectively, and also are polyoxypropylene derivatives of trimethylolpropane; Quadrol which is N,N,N',N'-tetrakis(2-hydroxypropyl)ethylene diamine, and the like.

Suitable solvents for the polyisocyanate and polyol components are dioxane (1,4-diethylene dioxide), Cellosolve acetate, toluene, 2-ethoxy ethylene acetate, acetone, methyl ethyl ketone, and the like, all of which are well-known in the art.

Catalysts which may be used and are well-known include triethylamine, ethanolamine, tribenzylamine, dimethylaniline, benzoylperoxide, ammonia, triethylene diamine, dibutyl tin dilaurate, stannous octoate, triethanolamine, and the like.

The following examples are merely illustrative of the present invention and should not be considered limiting its scope in any way.

EXAMPLE 1

A tetrabutyl titanate solution consisting of one part by volume of titanate and two parts by volume of anhydrous n-butanol was prepared by dissolving the titanate ester at room temperature in the solvent. The solution thus obtained was sprayed, using compressed dry air, onto the exterior surface of glass bottles at the rate of 1 g.p.h. as they were continuously being conveyed from the bottle-forming machine to the annealing lehr. The temperature of the surface was about 1100° F. and the titanate was pyrolyzed almost immediately. A clear, transparent coating formed upon the surface of the bottles which was hard, but the bottles could, nevertheless, be scratched by firmly rubbing two containers against each other.

EXAMPLE 2

A number of uncoated bottles similar to those used in Example 1 were coated by spraying thereon a formulation having 5% solids and consisting of 2.5 parts by weight of a polyester (Multron R-12) formed by the reaction of adipic acid with ethylene glycol (wherein the polyester has an OH number of 158-175, a specific gravity of 1.13 and a viscosity of 400 cps. at 73° C.) and 2.5 parts by weight polyisocyanate (Mondur CB-75) in 95 parts Cellosolve acetate. Cellosolve is better known as ethylene glycol monoethyl ether. The bottles were at room temperature when sprayed, and were then cured for 15 minutes at 230° F. Rubbing two of the bottles hard against each other by hand resulted in scratches developing on both surfaces.

EXAMPLE 3

The process of Example 2 was repeated except that a 1% solids formulation was used.

EXAMPLE 4

A number of bottles were first treated by the process as defined in Example 1, and the coated bottles were then further treated in accordance with the process of Example 2. The combined thickness of the coatings was about 1 micron. When two of the bottles were rubbed hard against each other, no scratches developed on either bottle. When two uncoated bottles are rubbed together, even lightly, scratching of the bottles readily occurs.

EXAMPLE 5

Several bottles were coated in the manner of Example 4 except that the polyurethane formulation contained only 1% of the same solids. Again, no scratches developed on the surfaces when two bottles were rubbed hard by hand.

Mondur CB-75 used in the above examples has the formula

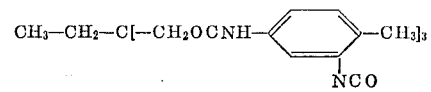

EXAMPLE 6

Additional bottles coated in the manner of Example 1 and cooled to room temperature were sprayed with the following composition:

| | Parts by weight |
|---|---|
| Hydroxypropyl glycerine (Hyprin GP-30) | 4 |
| Tolylene diisocyanate (80% 2,4 and 20% 2,6) | 5.4 |
| Triethanolamine | 0.6 |
| Cellosolve acetate | 90.0 |

Three double passes were made over the bottle surfaces using the above composition which had been diluted to 1% strength, with a hand spray gun and the coated bottles were then cured for 15 minutes at 120° C. A thin, transparent, substantially colorless, invisible coating was formed on the bottles and, when two coated bottles were rubbed hard together, the surfaces remained unscratched.

Bottles treated in accordance with the foregoing examples were tested with a scratch test machine to evaluate the effectiveness of the respective coatings. The machine is designed to abrade the surface of one glass bottle against the surface of a similar bottle, and is illustrated in copending application Serial No. 355,252, filed March 27, 1964, and assigned to the same assignee. Thus, a bottle is fastened securely in a stationary low set of chucks, while a second bottle is fastened in a set of upper chucks which are positioned so that the axes of the bottles are at 90° relative to each other. A test load is applied to the upper bottle while it is being driven at a constant speed of 2.8 inches per minute in a direction 45° to the axis of each bottle. The actual rate of scratch propagation on the bottles is then 2 inches per minute.

Using the test apparatus, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted.

The force exerted by the second bottle is a known, measured force and, after each pass, the bottles are examined for scratches. The force, or load, in pounds was measured with respect to the scratch resistance of dry bottles and bottles which were wetted with water, i.e., measured while the contacting surfaces in the above test machine were submerged in water; and bottles which had first been subjected to a caustic wash comprising a 5% NaOH aqueous solution at a temperature of 150° F. for a period of one-half hour. The results are set forth below and are compared with an uncoated bottle:

TABLE I

| | Number of pounds to produce scratch | | | |
|---|---|---|---|---|
| Example | | | After Caustic Wash | |
| | Dry | Wet | Dry | Wet |
| Uncoated bottle | 2 | 3 | 2 | 5 |
| 1 | 2 | 2 | 7 | 4 |
| 2 | 85 | 20 | | |
| 3 | 10 | 10 | | |
| 4 | 100 | 100 | 100+ | 85 |
| 5 | 100 | 60 | 85 | 100+ |
| 6 | 115 | 70 | 70 | 55 |

The "+" after certain numerals in the above table indicates that no additional load was placed on the bottles and no scratches had yet developed on the surfaces.

While the second coating in the above examples was applied to bottles which were first heated to below 350° F. prior to being coated, the same results are obtained when the bottles are coated shortly after being formed and as they are cooling while passing through the annealing lehr. It is important that the polyurethane coating be applied to the bottle while the temperature of the bottle is below that emperaure which will adversely affect any of the ingredients in the polyurethane-forming composition.

From the above table, the unexpected and synergistic results obtained by the process of the present invention over the coatings of Examples 1–3 are readily demonstrated. Since almost all food containers are subjected to a plurality of operations including washing, pasteurization, sterilization, caustic baths, and the like, the risk of scratching or abrading the bottles is particularly acute at such times, and it is precisely at such times that the coating of the present invention affords the most protection to the glass surfaces.

For purposes of this invention, it has been found that excellent results are obtained when the amount of titanium ester, such as tetrabutyl titanate, in the solvent, n-butanol, is about 1 part ester per two parts solvent, although up to 6 parts of solvent may be used per each part of ester. However, the scratch-resistance properties imparted to the glass are reduced when the ratio of titanate to solvent exceeds 1:3. When tetraisopropyl titanate is used for the hot-end coating, best results are obtained when the ratio of titanate to solvent is up to 1:2.5 parts isopropyl alcohol. When the alcohol solvent is present in larger amounts, the scratch-resistance properties imparted to the glass surface are reduced. While the titanates can be applied in 100% concentrations and good results are obtained, it is preferred to dissolve the titanate in a suitable solvent so as to facilitate the spraying thereof. One skilled in the art would merely have to make the necessary adjustments in the spraying apparatus to insure that a sufficient amount of ester was pyrolyzed to form the tightly adhering, substantially colorless and transparent titanium oxide coating on the glass surface.

In place of the foregoing titanium-containing compounds, the corresponding zirconium-containing compounds may be used, such as tetrabutyl zirconate, tetraisopropyl zirconate, zirconium tetrachloride, as may the vanadium-containing compounds, such as tri-n-butyl vanadate. All of these compounds have the ability to pyrolyze to the oxide of the respective metals on the hot glass surface.

The tin-containing compounds include stannic and stannous halides, such as chlorides, bromides and iodides, dialkyl tin dicarboxylates, such as dibutyl tin diacetate, and carboxylic acid salts of stannous tin, including the fatty acid salts thereof. Examples of suitable compounds are stannous oleate, stannous palmitate, stannous stearate, stannous caproate, stannous laurate, stannous naphthenate, stannous tartrate, stannous acetate, stannous gluconate, stannous octoate, and the like.

Having fully described the invention what is claimed is:

1. A method for increasing the abrasion-resistance of a glass surface comprising treating said surface with a titanium-, zirconium-, tin- or vanadium-containing compound which is pyrolyzable to form oxides of the metal on said glass surface while said surface is at a temperature at least as high as the pyrolyzing temperature of said compound, cooling said treated surface, and applying to the coated surface while at a temperature below 350° F. a polyurethane-forming composition consisting essentially of an organic polyisocyanate and an organic polyol and curing said formed polyurethane thereon, said compound and said composition being in an amount sufficient to form a thin, tightly adhering, transparent, substantially colorless coating on said surface.

2. A method for increasing the abrasion-resistance of a glass surface comprising spraying onto said surface a titanium-containing compound which is pyrolyzable to form oxides of titanium on said glass surface while said surface is at a temperature at least as high as the pyrolyzing temperature of said compound, cooling the coated surface and applying to said coated surface while at a temperature below 350° F. a polyurethane-forming composition consisting essentially of an organic polyisocyanate and an organic polyol, reacting said polyisocyanate and said polyol on said surface to form a polyurethane coating thereon and curing said polyurethane, said compound and said composition being in an amount sufficient to form a thin, tightly adhering, transparent, substantially colorless coating on said surface.

3. The method as defined in claim 2 wherein said titanium-containing compound is selected from the group consisting of alkyl titanate, titanium tetrahalide, ammonium salt of titanium lactate, and titanium acetyl acetonate.

4. The method as defined in claim 2 wherein said titanium-containing compound is an alkyl titanate wherein the alkyl has from 1 to 8 carbon atoms.

5. The method as defined in claim 2 wherein said titanium-containing compound is titanium tetrachloride.

6. The method as defined in claim 3 wherein said polyurethane-forming composition consists essentially of a polyisocyanate selected from the group consisting of tolylene diisocyanate, diphenylmethane 4,4'-diisocyanate, 3,3' - ditolylene 4,4' - diisocyanate, m - phenylene diisocyanate, p-phenylene diisocyanate, 4-chloro 1,3-phenylene diisocyanate, 4,4' - biphenylene diisocyanate, 1,5 - naphthalene diisocyanate, 3,3' - bitolylene 4,4' - diisocyanate, 3,3'-dimethyl diphenyl methane 4,4'-diisocyanate, 3,3'-dimethoxyl 4,4'-diphenylene diisocyanate, polymethylene polyphenyl diisocyanate, hexamethylene diisocyanate, and

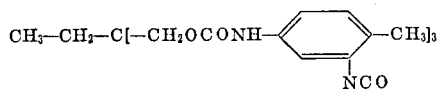

and a polyol selected from the group consisting of a polyester and a polyether.

7. The method as defined in claim 6 wherein said polyester is the reaction product of a member selected from the group consisting of a polycarboxylic acid and a polycarboxylic anhydride with a polyhydric alcohol, wherein said polycarboxylic acid and anhydride are each a member selected from the group consisting of adipic, malonic, succinic, glutaric, pimelic, and phthalic; and said alcohol is a member selected from the group consisting of ethylene glycol, diethylene glycol, 1,2-propylene glycol, trimethylol propane, 1,3-butylene glycol, 1,4-butylene glycol, and N-diethyl aminoethanol.

8. The method as defined in claim 6 wherein said polyether is a member selected from the group consisting of polyalkylene ether, polyalkylene glycol ether, hydroxypropyl glycerine, castor oil, trimethylolpropane, and N,N, N'N'-tetrakis (2-hydroxypropyl) ethylenediamine.

9. A method for increasing the abrasion-resistance of a glass surface comprising spraying onto said surface an alkyl titanate while said surface is at a temperature at least as high as the pyrolyzing temperature of said titanate and forming a coating consisting essentially of oxides of titanium on said surface, cooling said coated surface and applying to said coated surface while at a temperature of below 350° F. a polyurethane-forming composition consisting essentially of

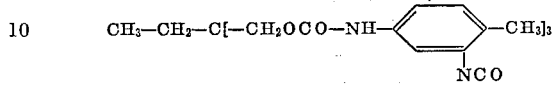

and an adipic acid-ethylene glycol polyester, reacting said isocyanate and said polyester on said coated surface and curing the polyurethane coating formed thereon, said titanate and said composition being in an amount sufficient to form a thin, tightly adhering, transparent, substantially colorless coating on said surface.

10. A method for increasing the abrasion-resistance of a glass surface comprising spraying onto said surface an alkyl titanate while said surface is at a temperature at least as high as the pyrolyzing temperature of said titanate and forming a coating consisting essentially of oxides of titanium on said surface, cooling said coated surface and applying to said surface while at a temperature of below 350° F. a polyurethane-forming composition consisting essentially of tolylene diisocyanate and hydroxypropyl glycerine, reacting said isocyanate and said glycerine on said coated surface and curing the polyurethane coating formed thereon, said titanate and said composition being in an amount sufficient to form a thin, tightly adhering, transparent, substantailly colorless coating on said surface.

11. An article of manufacture having a glass surface which has been made abrasion-resistant by having a thin, tightly adhering, transparent coating formed thereon in accordance with the process of claim 1.

References Cited
UNITED STATES PATENTS 3,320,203   5/1967   Kellert _____ 260—32.8 XR
3,323,889   6/1967   Carl et al. _____ 65—60 XR ALFRED L. LEAVITT, *Primary Examiner.*

W. F. CYRON, *Assistant Examiner.*